(12) United States Patent
Hirmer

(10) Patent No.: US 6,536,930 B1
(45) Date of Patent: *Mar. 25, 2003

(54) PANEL ASSEMBLY WITH INTEGRATED STOP SIGNAL

(76) Inventor: Gerhard F. Hirmer, 4 Dodie Street, Aurora, Ontario (CA), L4G 2L2

( * ) Notice: Subject to any disclaimer, the term of this patent is extended or adjusted under 35 U.S.C. 154(b) by 0 days.

This patent is subject to a terminal disclaimer.

(21) Appl. No.: 09/529,047

(22) PCT Filed: Oct. 5, 1998

(86) PCT No.: PCT/CA98/00942

§ 371 (c)(1),
(2), (4) Date: Jun. 2, 2000

(87) PCT Pub. No.: WO99/17956

PCT Pub. Date: Apr. 15, 1999

Related U.S. Application Data

(60) Provisional application No. 60/060,961, filed on Oct. 6, 1997.

(51) Int. Cl.[7] .................................. B60Q 1/26
(52) U.S. Cl. .................. 362/540; 362/31; 362/330; 362/339; 362/545
(58) Field of Search .................. 362/540, 31, 541, 362/542, 545, 551, 555, 330, 339

(56) References Cited

U.S. PATENT DOCUMENTS

| | | | |
|---|---|---|---|
| 4,806,903 A | | 2/1989 | Rust ........................ 340/97 |
| 4,935,722 A | * | 6/1990 | Pollack ..................... 307/10.8 |
| 4,967,317 A | * | 10/1990 | Plumly ...................... 362/31 |
| 5,075,826 A | | 12/1991 | Lan ............................. 362/83.3 |
| 5,165,772 A | | 11/1992 | Wu ............................... 362/261 |
| 5,525,401 A | * | 6/1996 | Hirmer ........................ 428/210 |
| 5,844,720 A | * | 12/1998 | Ohara et al. ................. 359/599 |
| 6,164,799 A | * | 12/2000 | Hirmer et al. ................ 362/31 |

FOREIGN PATENT DOCUMENTS

| | | |
|---|---|---|
| CA | 1094804 | 2/1981 |
| DE | 28 05 126 A1 | 8/1978 |
| DE | 297 008 393 U1 | 9/1997 |
| EP | 0 399 507 A2 | 11/1990 |
| EP | 0452 815 A1 | 10/1991 |
| EP | 0 399-507 A3 | 11/1991 |

* cited by examiner

*Primary Examiner*—Sandra O'Shea
*Assistant Examiner*—John Anthony Ward
(74) *Attorney, Agent, or Firm*—Clark Hill

(57) ABSTRACT

A panel assembly (10) for an automotive vehicle has a transparent panel (12) having opposing first (14) and second (16) surfaces. A portion of the first surface includes refractive structure (18) integral with the panel (12). At least one light source (22) is positioned at an edge of the panel for introducing light into the panel (12). The refractive structure (18) reflects light from the light source (22) out through a portion of the second surface (16). A film laminate (20) is positioned generally opposite the refractive structure (18). When the light source (22) is operatively connected to a vehicle braking system and the film laminate (20) is red, the panel assembly (10) will indicate a braking condition.

13 Claims, 1 Drawing Sheet

PANEL ASSEMBLY WITH INTEGRATED STOP SIGNAL

This application claims the benefit of Provisional Application No. 60/060,961, filed Oct. 6, 1997.

FIELD OF INVENTION

The present invention relates to a panel assembly for an automotive vehicle and, more particularly, to a panel assembly having an integrated stop signal which indicates braking of the vehicle.

BACKGROUND OF THE INVENTION

In a typical vehicle, an upper stop light is generally centrally located near and separate from the rear window of the vehicle. The upper stop light generally includes a box containing a light bulb with a red filter (lens) facing rearwardly. The box is mounted on the rear shelf of the vehicle next to the rear window and at the base of the rear window. Such construction requires many parts which increases the manufacturing cost and assembly time of the stop light.

SUMMARY OF INVENTION

The disadvantages of the prior art may be overcome by providing a panel assembly having an integrated stop signal reducing the number of parts and thus the manufacturing costs and assembly time of the rear window and stop light combination.

According to one aspect of the invention, there is provided a panel assembly for an automotive vehicle which has a transparent panel having opposing first and second surfaces. A portion of the first surface includes refractive structure integral with the panel. At least one light source is positioned at an edge of the panel for introducing light into the panel. The refractive structure reflects light from the light source out through a portion of the second surface. A film laminate is positioned generally opposite the refractive structure. When the light source is operatively connected to a vehicle braking system and the film laminate is red, the panel assembly will indicate a braking condition.

According to another aspect of the invention, there is provided method of producing a panel assembly for a vehicle. The method comprises the steps of:

molding a transparent panel to have opposing first and second surfaces such that a refractive structure is defined in a portion of the first surface during molding;

providing a film laminate on a portion of the second surface so as to generally oppose the refractive structure; and orienting at least one light source along an edge of the panel such that light emitted therefrom may be reflected by the refractive structure and passed through the film laminate.

DETAILED DESCRIPTION OF THE PREFERRED EMBODIMENT

Figure 1:
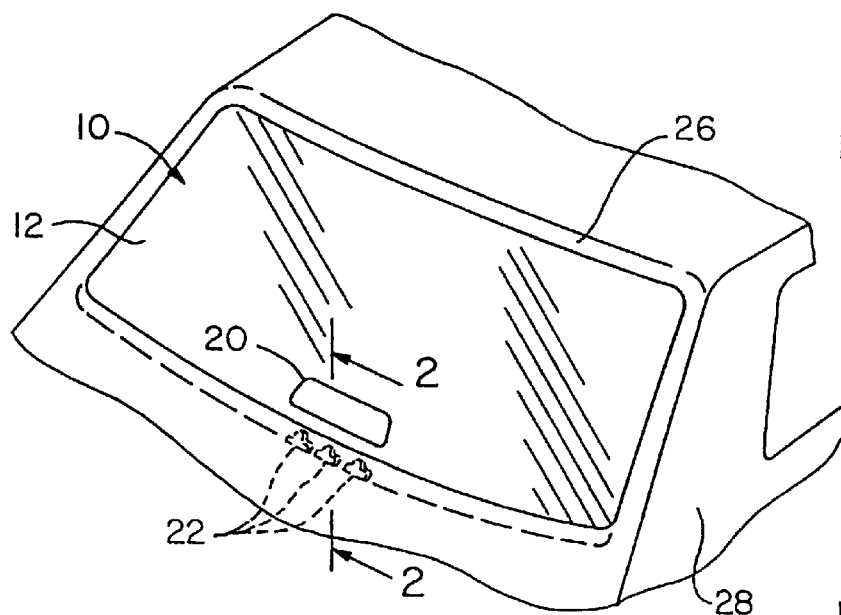
FIG. 1 is a perspective view of a panel assembly of the invention shown mounted at the rear portion of a vehicle.

Referring to the drawings, a panel assembly for an automotive vehicle is shown, generally indicated at 10, which embodies the principles of the present invention.

The panel assembly 10 includes a transparent panel 12, preferably made from molded plastic, having a first surface 14 and an opposing, second surface 16. A portion of the first surface 14 includes refractive structure 18. In the illustrated embodiment, the refractive structure 18 is integral with the panel 12 and is formed during an injection molding process. The refractive structure may define a multifaceted reflector.

Preferably refractive structure 18 is generally rectangular or trapezoidal in overall shape and is comprised of a plurality of preferably parallel facets formed in panel 12 and extending in the width direction of panel 12.

A film laminate 20 is provided on the second surface 16 at a position generally opposite the refractive structure 18. The laminate 20 is a thin, transparent film formed of thermoplastic material such as polycarbonate or polyester resin. The laminate 20 is also red in color to provide a brake light, as will be explained in more detail below.

Figure 2:
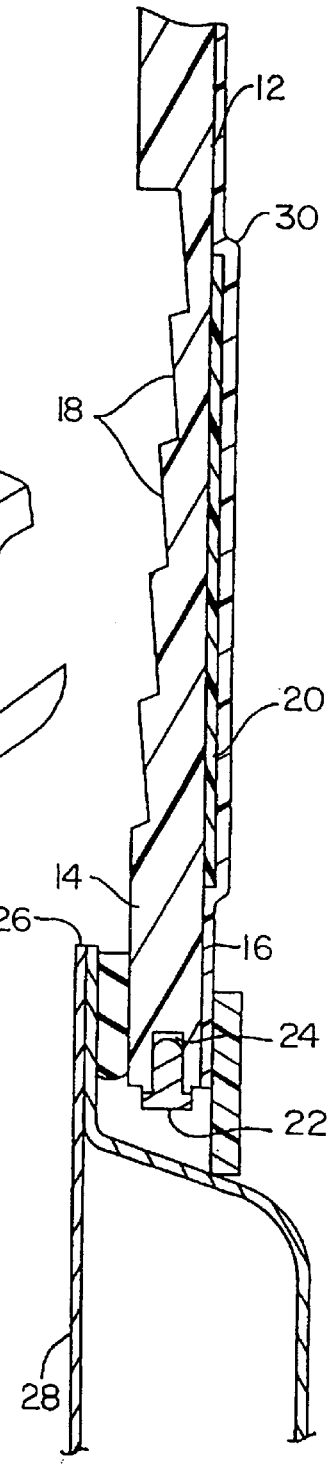
FIG. 2 is a cross-sectional view of the panel assembly taken along the line 2—2 of FIG. 1.

As best shown in FIG. 2, at least one light source 22 is positioned at an edge of the panel 12 for introducing light into the panel. In the illustrated embodiment, the light source 22 includes at least one LED light source which is received in a bore 24 defined in a bottom edge of the panel. It can be appreciated, however, that the number of LED's provided are dependent upon the amount of light which is to be seen or emitted through the film laminate 20. In the illustrated embodiment, three LED's are provided. Moreover, LED's produced by the Hewlet-Packard company are preferred.

With reference to FIG. 2, light rays introduced edgewise into the panel 12 will traverse the panel 12 so nearly parallel to the side faces of the panel that a high percentage will be transmitted within the panel and will not illuminate the faces of the panel. Light rays which strike the refractive structure 18, however, will be refracted or reflected and dispersed out of the planes of the panel's large faces 14 and 16. Accordingly, the red film laminate 20 will glow brightly so as to be recognizable as a brake light.

The light sources are operably connected to the vehicle's braking system and are thus responsive in a conventional manner to a brake signal from the vehicle so that the light sources, and thus red film laminate 20, will illuminate upon application of the vehicle's brakes.

As shown in FIGS. 1 and 2, the panel assembly 10 may be utilized as a rear window for an opening 26 in a vehicle 28. In a rear window application, the panel assembly 10 is sealingly mounted with respect to the rear opening 26 in a conventional manner.

The material choice of the window is clear thermoplastic material taken from the group consisting of polycarbonate, polymethyl methacrylate, and cyclic polyolefin and may include an abrasion resistant coating 30. As mentioned above, the panel 12 and integral refractive structure 18 are integrally molded together in an appropriately shaped mold assembly used in conjunction with an injection molding process.

While the coating 30 shown in FIG. 2 is applied to only second surface 16, the coating may be applied to either or both surfaces 14 and 16. The coating preferably comprises a thermoset material taken from the group consisting of polysiloxane, acrylic resin, and aliphatic polyurethane. The coating may be applied by placing a sheet of coating material onto a surface of the mold prior to the injection molding process, by dip coating the entire fabricated panel, or by spraying or flow coating one or both surfaces of the fabricated panel.

Additionally, the panel assembly 10 could be treated with a UV absorbing agent to resist UV damage. Such agents, including polydimethylsiloxane, could also be added to or included with the coating 30.

While the invention has been described in connection with what is presently considered to be the most practical and preferred embodiment, it is understood that the invention is not limited to the disclosed embodiment but, on the contrary, it intended to cover various modifications in the arrangements.

I claim:

1. A panel assembly (10) for use as a rear window of an automotive vehicle comprising:

a transparent panel (12) having opposing, generally planar, first (14) and second surfaces (16), a portion of said first surface including a refractive structure (18) having a plurality of facets formed integral with said panel;

at least one light source (22) positioned at an edge of said panel for introducing light into said panel between said first and second surfaces;

said refractive structure (18) constructed and arranged to reflect light from said light source against said facets and out through a portion of said second surface, characterized by said second surface having a red film laminate (20) positioned generally opposite said refractive structure for illumination by said reflected light.

2. A panel assembly as claimed in claim 1 wherein said transparent panel (12) is a molded plastic panel and said refractive structure (18) is molded therein.

3. A panel assembly as claimed in claim 2, wherein said light source (22) is an LED.

4. A panel assembly as claimed in claim 3, wherein said plastic panel is a clear thermoplastic material selected from the group consisting of polycarbonate, polymethyl methacrylate and cyclic polyolefin.

5. A panel assembly as claimed in claim 4 wherein at least one of said first and second surfaces (14, 16) is covered with an abrasion resistant coating.

6. A panel assembly as claimed in claim 5, wherein said abrasion resistant coating is a thermoset material selected from the group consisting of polysiloxane, acrylic resin and aliphatic polyurethane.

7. A panel assembly as claimed in claim 6 wherein said panel assembly (10) is treated with a UV absorbing agent.

8. A panel assembly as claimed in claim 7, wherein said refractive structure (18) is a multifaceted reflector molded integrally with said transparent panel (12).

9. A panel assembly as claimed in claim 8, wherein said light source (22) is responsive to actuation of a braking system of the vehicle.

10. A method of producing a panel assembly (10) for use as a rear window of an automotive vehicle comprising:

molding a one piece transparent panel (12) to have opposing, generally planar, first (14) and second surfaces (16) such that a refractive structure (18) of a plurality of facets is defined in a portion of said first surface during said molding;

providing a red film laminate (20) on a portion of the second surface; and orienting at least one light source (22) along an edge of the panel, characterized by positioning the red film laminate (20) opposite the refractive structure (18) such that light emitted from the light source into the panel and between the first and second surfaces may be reflected by the refractive structure off the facets and passed through the red film laminate (20) for illumination by the reflected light.

11. A method as claimed in claim 10, wherein said panel (12) is molded from a plastic material selected from the group consisting of polycarbonate, polymethyl methacrylate and cyclic polyolefin.

12. A method as claimed in claim 11, wherein said molding step includes molding said refractive structure (18) in such a manner that said refractive structure comprises a plurality of facets in said first surface (14).

13. A method as claimed in claim 12 wherein the orienting step includes securing said at least one light source (22) within a bore defined in said edge.

* * * * *